US012786013B2

(12) United States Patent
Wei et al.

(10) Patent No.: US 12,786,013 B2
(45) Date of Patent: Nov. 3, 2026

(54) SIGNAL TRANSMISSION METHOD AND APPARATUS, TERMINAL DEVICE, SMART DEVICE, AND ELECTRONIC DEVICE

(71) Applicant: VIVO MOBILE COMMUNICATION CO., LTD., Dongguan (CN)

(72) Inventors: Xusheng Wei, Dongguan (CN); Dajie Jiang, Dongguan (CN); Fei Qin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 655 days.

(21) Appl. No.: 18/138,030

(22) Filed: Apr. 21, 2023

(65) Prior Publication Data

US 2023/0261903 A1 Aug. 17, 2023

Related U.S. Application Data

(63) Continuation of application No. PCT/CN2021/124920, filed on Oct. 20, 2021.

(30) Foreign Application Priority Data

Oct. 22, 2020 (CN) ......................... 202011140745.X

(51) Int. Cl.
*H04L 25/02* (2006.01)
*H04B 17/336* (2015.01)

(52) U.S. Cl.
CPC ....... *H04L 25/0204* (2013.01); *H04B 17/336* (2015.01)

(58) Field of Classification Search
CPC ............ H04L 25/0204; H04L 25/0202; H04B 17/336; H04B 5/45; H04B 1/10; H04B 7/22; H04B 17/345
See application file for complete search history.

(56) References Cited

U.S. PATENT DOCUMENTS

2007/0206705 A1 9/2007 Stewart
2020/0107324 A1* 4/2020 Kim .................. H04W 72/0466

FOREIGN PATENT DOCUMENTS

CN 101523737 A 9/2009
CN 109547039 A 3/2019
CN 109547183 A 3/2019
CN 111246493 A 6/2020
(Continued)

OTHER PUBLICATIONS

International Search Report issued in corresponding International Application No. PCT/CN2021/124920, mailed Jan. 19, 2022, 4 pages.

(Continued)

*Primary Examiner* — Derrick W Ferris
(74) *Attorney, Agent, or Firm* — IPX PLLC

(57) ABSTRACT

A signal transmission method and apparatus, a terminal device, a smart device, and an electronic device, are provided. The signal transmission method includes: sending, by a terminal device, a first signal to a smart device having a backscatter function, and receiving a second signal reflected by the smart device; and performing, by the terminal device when the smart device stops reflecting the second signal, channel estimation on an interference channel.

16 Claims, 13 Drawing Sheets

(56) References Cited

FOREIGN PATENT DOCUMENTS

| | | | | |
|---|---|---|---|---|
| CN | 111246493 B | * | 4/2022 | ............ H04W 16/26 |
| KR | 101953607 B1 | | 3/2019 | |

OTHER PUBLICATIONS

Chen Chen et al, "Signal detection with channel estimation error for full duplex wireless system utilizing ambient backscatter", 2017 9th International Conference on Wireless Communications and Signal Processing (WCSP), Oct. 2017, 3 pages.

Extended European Search Report issued in related European Application No. 21882035.5, mailed Mar. 7, 2024, 8 pages.

First Office Action issued in related Chinese Application No. 202011140745.X, mailed May 30, 2024, 8 pages.

Chen Chen et al, "Signal detection with channel estimation error for full duplex wireless system utilizing ambient backscatter", 2017 9th International Conference on Wireless Communications and Signal Processing (WCSP), Oct. 13, 2017.

* cited by examiner

SIGNAL TRANSMISSION METHOD AND APPARATUS, TERMINAL DEVICE, SMART DEVICE, AND ELECTRONIC DEVICE

CROSS-REFERENCE TO RELATED APPLICATIONS

This application is a continuation of International Application No. PCT/CN2021/124920, filed on Oct. 20, 2021, which claims the priority of Chinese Patent Application No. 202011140745.X, filed on Oct. 22, 2020. The entire contents of each of the above-identified applications are expressly incorporated herein by reference.

TECHNICAL FIELD

This application belongs to the field of communication technologies, and specifically relates to a signal transmission method, a signal transmission apparatus, a terminal device, a smart device, an electronic device, and a computer-readable storage medium.

BACKGROUND

In the related technology, a backscatter technology, as a low-power or passive communication technology, can achieve green communication. The characteristic of a communication implementation of the backscatter technology is that its own information may be transmitted through environmental signals. In the backscatter technology, received signals include useful target reflected signals and interference signals reflected from an environment.

These interference signals seriously affect the communication quality of backscatter communication, resulting in poor communication quality.

SUMMARY

Embodiments of this application provide a signal transmission method and apparatus, a terminal device, a smart device, and an electronic device.

According to a first aspect, an embodiment of this application provides a signal transmission method. The method includes:

sending, by a terminal device, a first signal to a smart device having a backscatter function, and receiving a second signal reflected by the smart device; and performing, by the terminal device when the smart device stops reflecting the second signal, channel estimation on an interference channel.

According to a second aspect, an embodiment of this application provides a signal transmission apparatus. The apparatus includes:

a communication unit, through which a terminal device sends a first signal to a smart device having a backscatter function, and receives a second signal reflected by the smart device; and a time domain estimation unit, through which the terminal device performs, when the smart device stops reflecting the second signal, channel estimation on an interference channel.

According to a third aspect, an embodiment of this application provides a signal transmission method. The method includes:

receiving, by a smart device, a first signal sent by a terminal device, and reflecting a second signal to the terminal device; and stopping, by the smart device when a preset condition is met, reflecting the second signal to the terminal device, to enable the terminal device to perform channel estimation on an interference channel.

According to a fourth aspect, an embodiment of this application provides a signal transmission apparatus. The apparatus includes:

a reflection unit, through which a smart device receives a first signal sent by a terminal device, and reflects a second signal to the terminal device; and an interruption unit, through which the smart device stops, when a preset condition is met, reflecting the second signal to the terminal device, to enable the terminal device to perform channel estimation on an interference channel.

According to a fifth aspect, an embodiment of this application provides a terminal device. The terminal device includes:

a first memory, storing a program or an instruction; and a first processor, configured to implement, when executing the program or instruction, steps of the signal transmission method according to the first aspect.

According to a sixth aspect, an embodiment of this application provides a smart device. The smart device includes:

a second memory, storing a program or an instruction; and a second processor, configured to implement, when executing the program or instruction, steps of the signal transmission method according to the third aspect.

According to a seventh aspect, an embodiment of this application provides an electronic device. The electronic device includes a processor, a memory, and a program or an instruction stored in the memory and executable on the processor, the program or instruction, when executed by the processor, implementing steps of the signal transmission method according to the first aspect; and/or steps of the signal transmission method according to the third aspect.

According to an eighth aspect, an embodiment of this application provides a readable storage medium. The readable storage medium stores a program or an instruction, the program or instruction, when executed by a processor, implementing steps of the signal transmission method according to the first aspect; and/or steps of the signal transmission method according to the third aspect.

According to a ninth aspect, an embodiment of this application provides a chip. The chip includes a processor and a communication interface, the communication interface is coupled to the processor, and the processor is configured to run a program or an instruction to implement the signal transmission method according to the first aspect; and/or steps of the signal transmission method according to the third aspect.

In the embodiments of this application, a terminal device transmits a first signal to a smart device having a backscatter function. The smart device can reflect, based on its own reflection rule, the first signal through an RF (Radio Frequency) circuit arranged in the smart device, to reflect a second signal to the terminal device for receiving, and implement wireless data communication between the smart device and the terminal device. The smart device may be set as a passive device.

During a process of backscatter communication between the smart device and the terminal device, the smart device reflects a second signal in a first time domain, and stops reflecting the second signal to the terminal device in a second time domain, so that the second time domain is formed as a "signal interruption period" for the terminal device. Therefore, the terminal device can use the second time domain, that is, the "signal interruption period", to perform channel estimation on an interference channel in the backscatter communication, and obtain an Impulse Response (IR) of the interference channel, so that the terminal device can eliminate an interference signal in a subsequently-received reflected signal by using the impulse response.

In the embodiments of this application, backscatter transmission may be started or stopped in time domain, channel estimation is performed on an interference signal in a time period when the backscatter transmission stops, and interference elimination is performed in a next backscatter transmission period by using a channel estimation result, to obtain channel state information of the interference signal.

DETAILED DESCRIPTION

The following describes the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data termed in such a way is interchangeable in proper circumstances, so that the embodiments of this application can be implemented in other sequences than the sequence illustrated or described herein. In addition, "and/or" in the specification and claims represents at least one of connected objects. The character "/" generally indicates an "or" relationship between the associated objects.

The following describes the signal transmission method, signal transmission apparatus, terminal device, smart device, electronic device, and readable storage medium provided in the embodiments of this application in detail through specific embodiments and application scenarios thereof with reference to the accompanying drawings.

Figure 1:
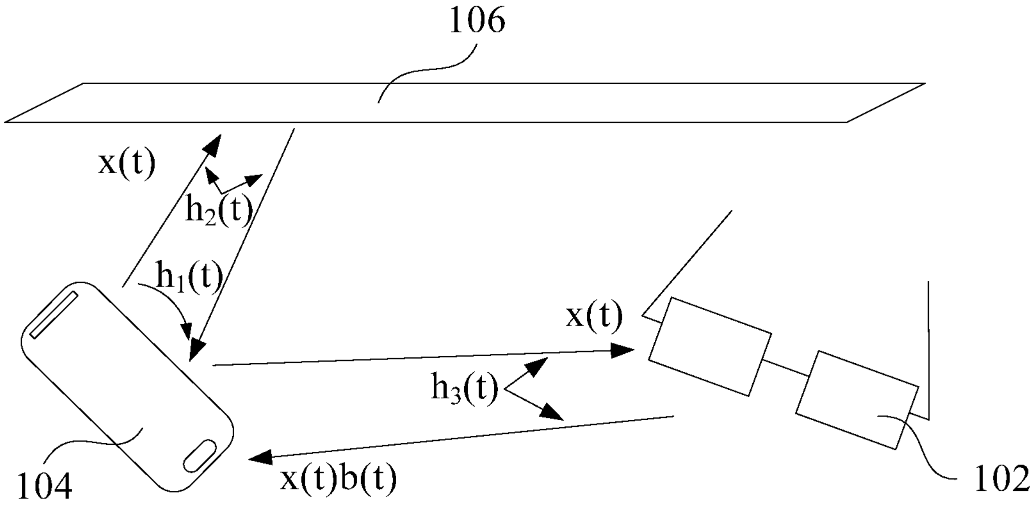
FIG. 1 is a schematic diagram of a backscatter communication system.

In the embodiments of this application, a sending end of a radio frequency signal and a receiving end of a backscatter signal are a same device, that is, the foregoing terminal device is used as an example for description. FIG. 1 is a schematic diagram of a backscatter communication system. In some implementations, after receiving a first signal, a smart device 102 having a backscatter function reflects, based on a self-defined reflection rule, the first signal, and a terminal device 104 receives a second signal reflected by the smart device 102, to obtain information sent by the smart device 102. In addition, because a signal is also reflected by objects in an environment, such as a wall, an environment 106 in FIG. 1 also reflects an interference signal to the terminal device 104.

In this process, a specific system model may be expressed as:

$$y(t)=h_1(t)x(t)+h_2(t)x(t)+h_3(t)x(t)b(t)+n.$$

y(t) is a reflected signal received by a terminal device, x(t) is a sending signal, $h_1(t)$ is a self-interfering channel, $h_2(t)$ is an integrated channel at a receiving end (terminal device) for a signal reflected by an environment, $h_3(t)$ is an integrated channel for the reflected signal, b(t) is a backscattered channel signal, and n is a white noise.

According to the embodiments of this application, an influence brought by an interference channel is eliminated, that is, an influence brought by the $h_1(t)$ and $h_2(t)$ is eliminated. Self-interference $h_1(t)$ in a received signal may also be eliminated through a physical isolation device (such as a duplexer, a circulator, and the like) at a sending end and a receiving end.

Figure 2:
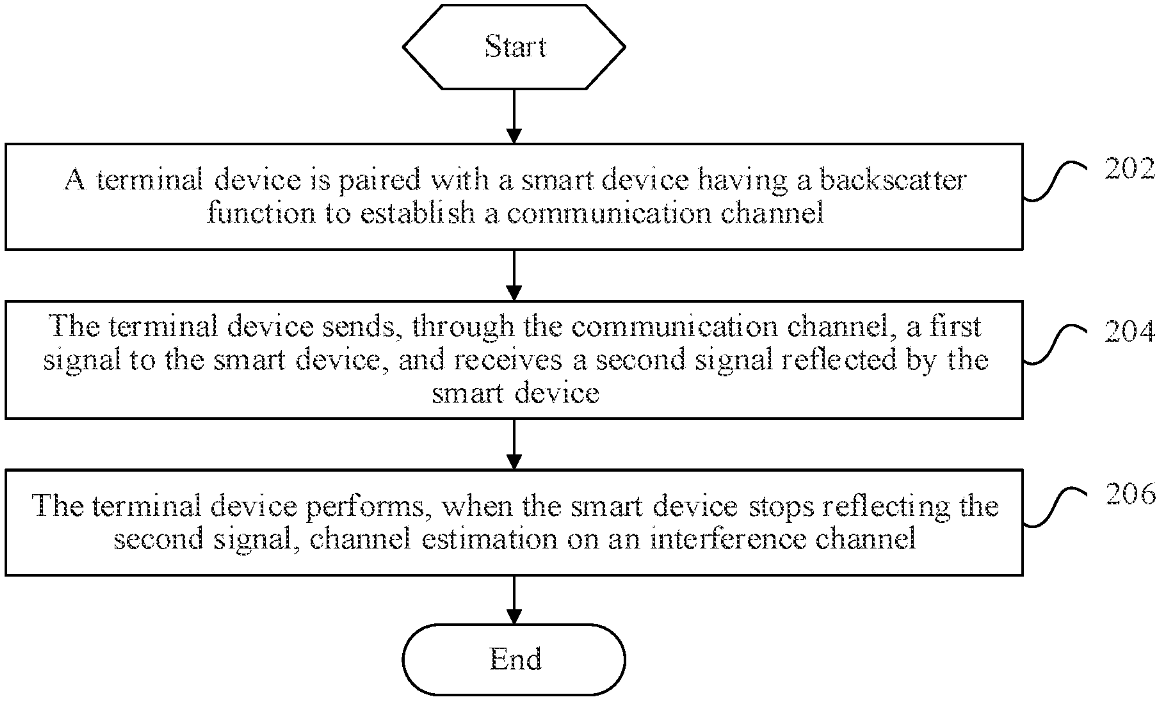
FIG. 2 is a first flowchart of a signal transmission method according to an embodiment of this application.

FIG. 2 is a first flowchart of a signal transmission method according to an embodiment of this application. Specifically, the signal transmission method may include the following steps.

Step 202: A terminal device is paired with a smart device having a backscatter function to establish a communication channel.

Step 204: The terminal device sends, through the communication channel, a first signal to the smart device, and receives a second signal reflected by the smart device.

Step 206: The terminal device performs, when the smart device stops reflecting the second signal, channel estimation on an interference channel.

In the embodiments of this application, specifically, the terminal device is paired with the smart device to establish a communication channel, and the terminal device continuously sends, through the communication channel, the first signal to the smart device. The smart device may charge its own circuit through energy carried by the first signal and accumulate energy. In addition, the smart device reflects, based on a self-defined reflection rule through the communication channel, the second signal to the terminal device.

In some implementations, the second signal includes a first signal reflected by the smart device, and information added by the smart device based on its own condition. The added information includes device information and a device state of the smart device, feedback information generated by the smart device based on the first signal, and the like.

In some implementations, the smart device reflects, based on its own reflection rule, a received first signal at different energy levels, to form the second signal. When receiving a reflected second signal, the terminal device may decode and read, based on a signal energy level, the second signal, to obtain the information added by the smart device.

In some implementations, the reflection rule includes reflection states including two states of "reflecting a high-intensity signal" and "reflecting a low-intensity signal". In some implementations, the reflecting the high-intensity signal may be represented by "1", and correspondingly, the reflecting the low-intensity signal may be represented by "0". Therefore, the smart device performs, based on the reflection rule, reflections in different states, so that the reflected second signal includes binary data formed by "0" and "1", and the data includes the added information, to implement information interaction with the terminal device.

When the smart device stops reflecting the second signal, the terminal device no longer receives the second signal, to forma "signal interruption period" for the terminal device. Therefore, the terminal device can use this "signal interruption period" to perform channel estimation on the interference channel in the backscatter communication, and then eliminate an interference signal in a subsequent received reflected signal. Therefore, interference is effectively removed, a problem of signal interference can be solved, and communication quality of a passive or low-power device in backscatter communication can be improved.

In the embodiments of this application, backscatter transmission may be started or stopped in time domain, channel estimation is performed on an interference signal in a time period when the backscatter transmission stops, and interference elimination is performed in a next backscatter transmission period by using a channel estimation result, to obtain channel state information of the interference signal. Elimination of the interference signal during the backscatter transmission may improve reliability of transmission, thus improve transmission throughput, and significantly improve communication quality.

In some implementations, a smart device may stop reflecting a second signal by disabling an RF reflection circuit arranged by the smart device.

Figure 3:
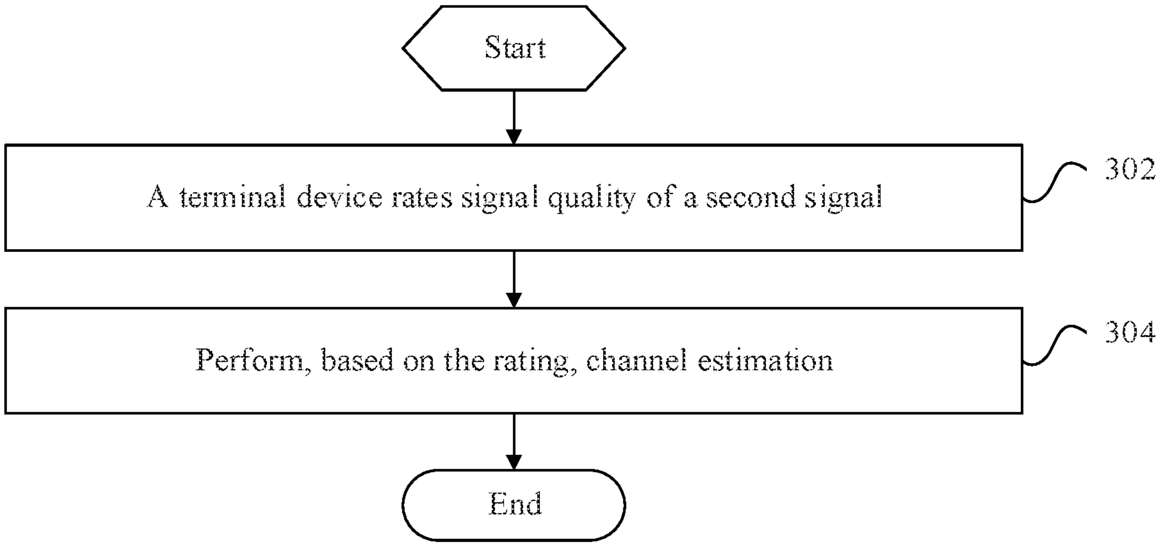
FIG. 3 is a second flowchart of a signal transmission method according to an embodiment of this application.

In some embodiments of this application, FIG. 3 is a second flowchart of a signal transmission method according to an embodiment of this application. In some implementations, the signal transmission method may include the following steps.

Step 302: A terminal device rates signal quality of a second signal.

Step 304: Perform, based on the rating, channel estimation.

In the embodiments of this application, when the terminal device receives a second signal reflected by a smart device, signal quality of the second signal is rated synchronously, to determine whether the quality of the second signal meets a communication requirement. Thus, channel estimation is performed, based on the rating, on an interference channel.

In some implementations, if the rating of the quality of the second signal indicates that current signal quality is poor, there are many interference signals from an environment, and interference needs to be eliminated, channel estimation is performed on the interference channel to eliminate an influence caused by the interference signal.

If the rating of the quality of the second signal indicates that the current signal quality is good, there is no need to perform channel estimation, and in this case, the smart device continuously reflects the second signal, to ensure communication efficiency.

Figure 4:
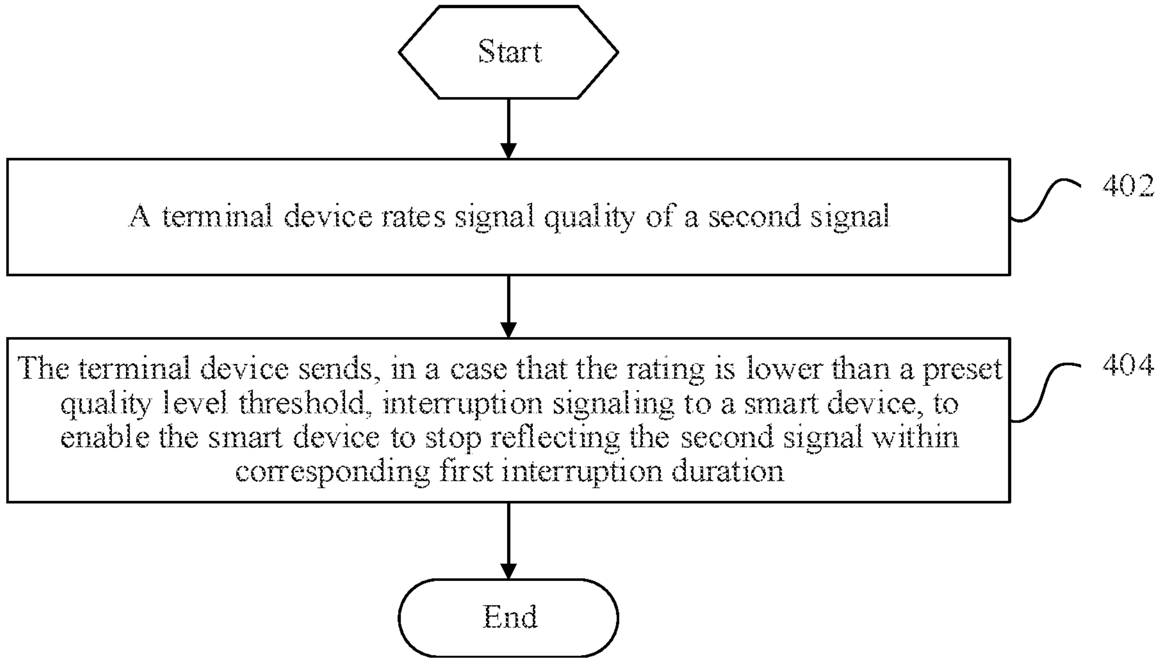
FIG. 4 is a third flowchart of a signal transmission method according to an embodiment of this application.

In some embodiments of this application, FIG. 4 is a third flowchart of a signal transmission method according to an embodiment of this application. Specifically, the signal transmission method includes the following steps.

Step 402: A terminal device rates signal quality of a second signal.

Step 404: The terminal device sends, in a case that the rating is lower than a preset quality level threshold, interruption signaling to a smart device, to enable the smart device to stop reflecting the second signal within corresponding first interruption duration.

In the embodiments of this application, if the rating of the quality of the second signal is lower than the quality level threshold, it indicates that current signal quality is poor, there are many interference signals from an environment, and interference needs to be eliminated. In this case, the terminal device sends a piece of interruption signaling to the smart device.

Figure 5:
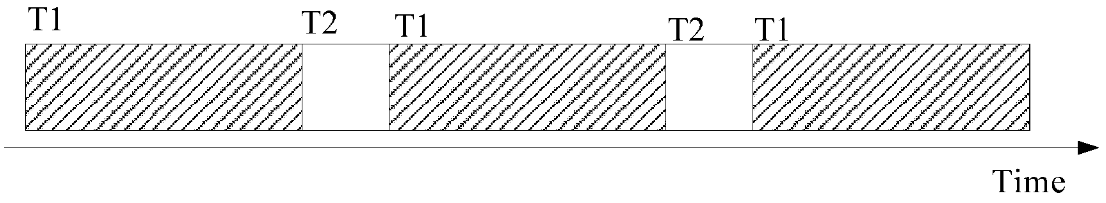
FIG. 5 is a schematic diagram of first interruption duration in time division transmission.

In some implementations, FIG. 5 is a schematic diagram of first interruption duration in time division transmission. As shown in FIG. 5, a smart device continuously reflects a second signal in a time domain T. After the smart device receives interruption signaling, the smart device stops reflecting the second signal within set first interruption duration T3, to form a "signal interruption period" within the interruption duration. Therefore, the terminal device can use the interruption duration, that is, the "signal interruption period", to perform channel estimation on the interference channel in the backscatter communication, and then eliminate an interference signal in a subsequent received reflected signal. Therefore, interference is effectively removed, a problem of signal interference can be solved, and communication quality of a passive or low-power device in backscatter communication can be improved.

In some embodiments of this application, the smart device stops reflecting the second signal within second interruption duration. The second interruption duration is predefined by a protocol; or the second interruption duration is determined based on a channel transmission speed of a communication channel between the terminal device and the smart device.

In the embodiments of this application, after the terminal device is paired with the smart device, a communication channel is established. The terminal device sends a first signal through the communication channel, and receives a second signal reflected by the smart device through the communication channel. Time domain division is performed, in a time division transmission manner, on the communication channel.

Figure 6:
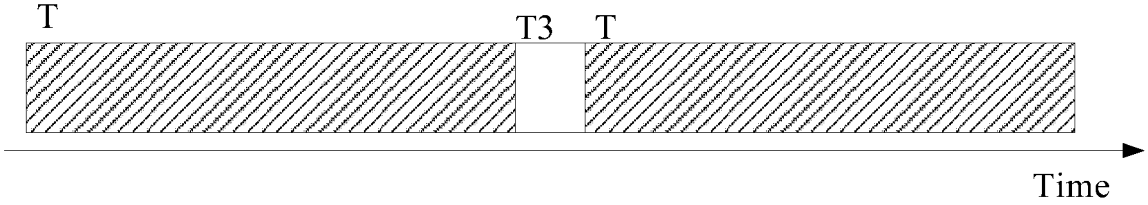
FIG. 6 is a schematic diagram of time domain division of time division transmission.

In some implementations, a time domain resource of the communication channel is divided based on a time division method. FIG. 6 is a schematic diagram of time domain division of time division transmission. T2 is the foregoing second interruption duration. In T1, a smart device normally reflects a second signal. In T2, the smart device stops reflecting the second signal.

In some implementations, a specific length of second interruption duration may be predefined through a communication protocol between a terminal device and the smart device.

In some implementations, the second interruption duration may also be dynamically adjusted based on a result of channel estimation. In some implementations, after the terminal device performs channel estimation, the result of channel estimation may be obtained. If there is a large deviation between results of two channel estimations, it indicates that a current channel changes rapidly, and in this case, a trigger frequency of the second interruption duration may be appropriately adjusted to ensure communication quality.

Figure 7:
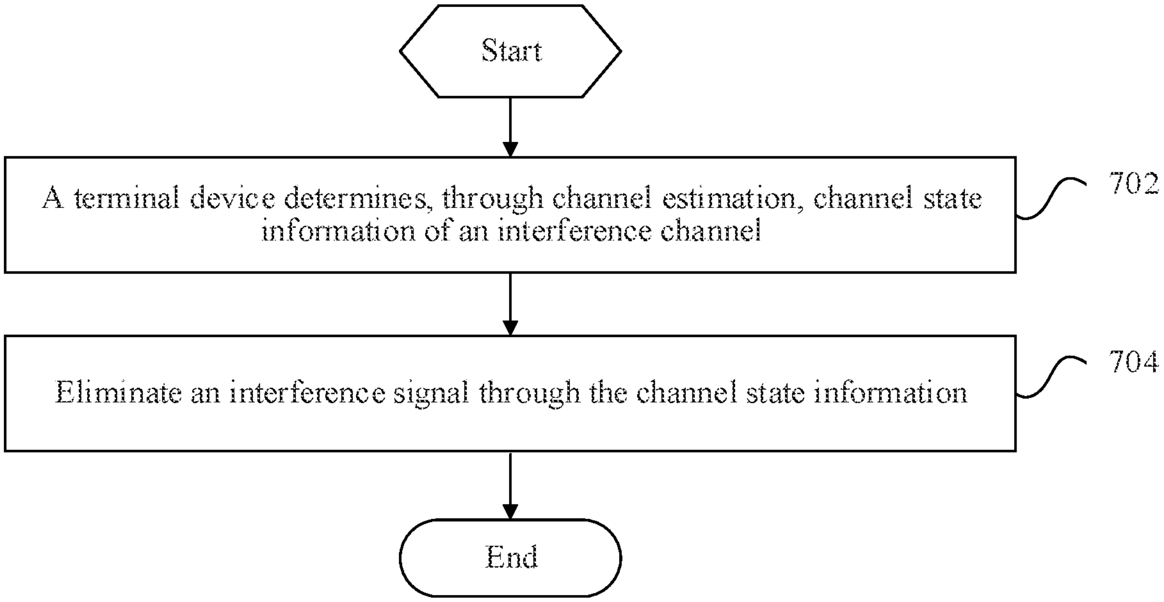
FIG. 7 is a fourth flowchart of a signal transmission method according to an embodiment of this application.

In some embodiments of this application, FIG. 7 is a fourth flowchart of a signal transmission method according to an embodiment of this application. In some implementations, the signal transmission method includes the following steps.

Step 702: A terminal device determines, through channel estimation, channel state information of an interference channel.

Step 704: Eliminate an interference signal through the channel state information.

In the embodiments of this application, when a smart device stops reflecting a second signal, reflected signals received by the terminal device all come from interference signals reflected by an environment.

In this case, channel estimation is performed on the interference channel, to obtain the channel state information of the interference channel, which may specifically be an impulse response of the interference channel. By using the channel state information, a received interference signal may be effectively eliminated, to improve communication quality of backscatter communication.

In some implementations, when the interference signal is eliminated, the Channel State Information (CSI) of the interference channel may be determined by using the obtained impulse response, and an interference signal $h_2(t)$ in a reflected signal received in a second time domain may be effectively eliminated by using the channel state information, to ensure the communication quality of the backscatter communication.

Figure 8:
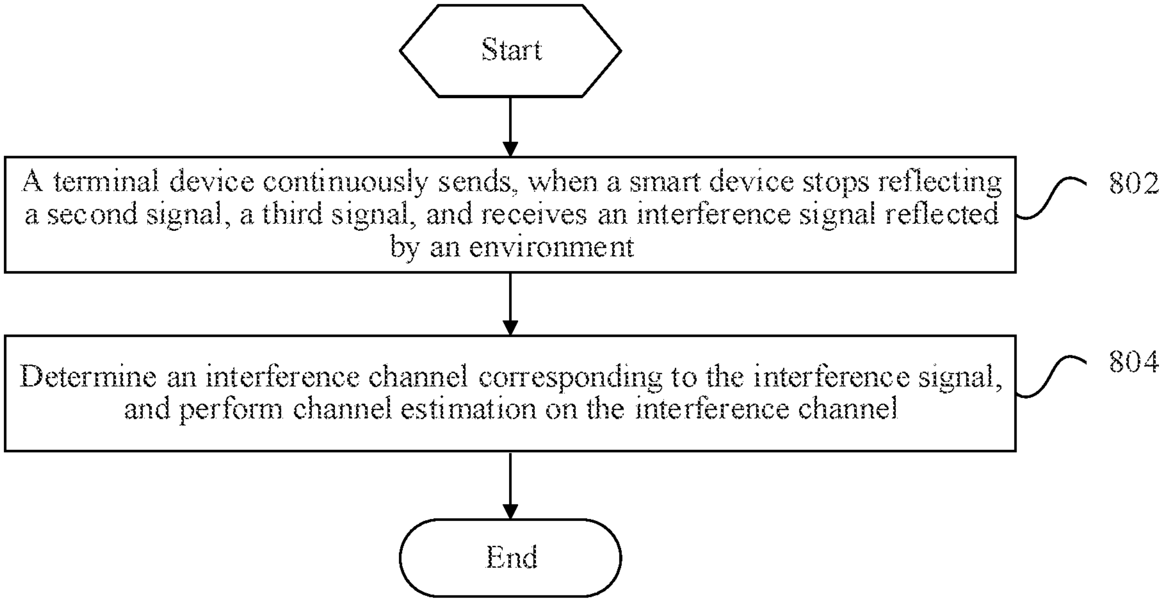
FIG. 8 is a fifth flowchart of a signal transmission method according to an embodiment of this application.

In some embodiments of this application, FIG. 8 is a fifth flowchart of a signal transmission method according to an embodiment of this application. In some implementations, steps in which a terminal device performs channel estimation on an interference channel include:

Step 802: A terminal device continuously sends, when a smart device stops reflecting a second signal, a third signal, and receives an interference signal reflected by an environment.

Step 804: Determine an interference channel corresponding to the interference signal, and perform channel estimation on the interference channel.

The third signal is a preset signal, or the third signal is a first signal.

In the embodiments of this application, when the smart device stops reflecting the second signal, the terminal device continuously sends the third signal, and in this case, reflected signals that can be received by the terminal device all come from interference signals reflected by an environment.

In this case, a corresponding interference channel can be accurately determined based on a currently received interference signal, so that channel estimation is performed on the interference channel, and a received interference signal may be effectively eliminated, to improve communication quality of backscatter communication.

When the smart device stops reflecting the second signal, the terminal device may continuously transmit the first signal, determine the interference channel through the interference signal reflected by the environment through the first signal, and perform channel estimation. It can be understood that, during a period when the smart device stops reflecting the second signal, the terminal device may also transmit another signal different from the first signal, such as a preset third signal, and during a period when the smart device stops reflecting the second signal, a signal transmitted by the terminal device may be any signal. This is not limited in the embodiments of this application.

In some embodiments of this application, it should be noted that, the signal transmission method provided in the embodiments of this application may be performed by a signal transmission apparatus or a control module included in the signal transmission apparatus and configured to perform and load the signal transmission method. In the embodiments of this application, the signal transmission method provided in the embodiments of this application is described by using an example in which the signal transmission method is performed and loaded by the signal transmission apparatus.

Figure 9:
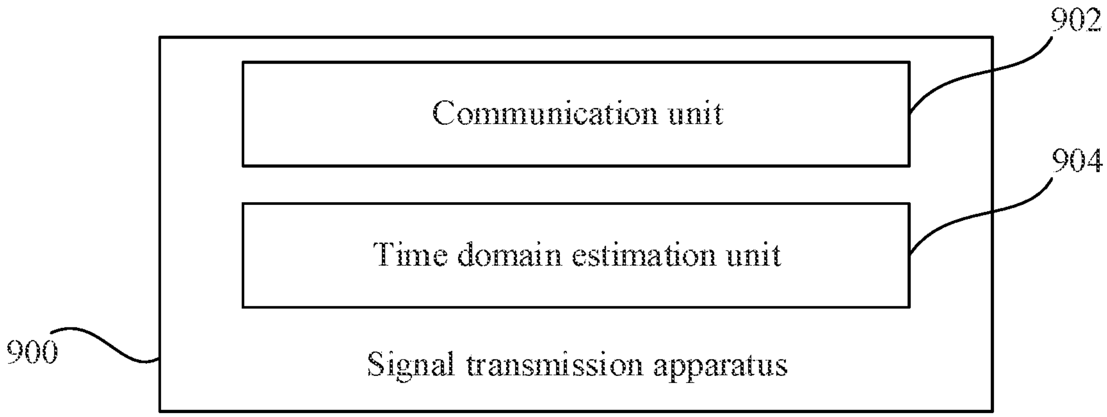
FIG. 9 is a first structural block diagram of a signal transmission apparatus according to an embodiment of this application.

FIG. 9 is a first structural block diagram of a signal transmission apparatus according to an embodiment of this application. Specifically, a signal transmission apparatus 900 includes:

- a communication unit 902, through which a terminal device sends a first signal to a smart device having a backscatter function, and receives a second signal reflected by the smart device; and
- a time domain estimation unit 904, through which the terminal device performs, when the smart device stops reflecting the second signal, channel estimation on an interference channel.

The smart device may charge its own circuit through energy carried by the first signal and accumulate energy. In addition, the smart device reflects, based on a self-defined reflection rule, the second signal to the terminal device.

In some implementations, a first signal transmitted by a terminal to the smart device is a continuous signal, and the smart device reflects, based on a reflection rule, the first signal. The reflection rule includes two reflection states of "reflecting a high-intensity signal" and "reflecting a low-intensity signal". In some implementations, the reflecting the high-intensity signal may be represented by "1", and the reflecting the low-intensity signal may be represented by "0". Therefore, the smart device may perform, based on the reflection rule, reflections in different states, to reflect a second signal of binary data formed by "0" and "1" and including information of the smart device to the terminal, thereby implementing signal interaction with the terminal device.

When the smart device stops reflecting the second signal, the terminal device no longer receives the second signal, to form a "signal interruption period" for the terminal device. Therefore, the terminal device can use this "signal interruption period" to perform channel estimation on the interference channel in the backscatter communication, and then eliminate an interference signal in a subsequent received reflected signal. Therefore, interference is effectively removed, a problem of signal interference can be solved, and communication quality of a passive or low-power device in backscatter communication can be improved.

In the embodiments of this application, backscatter transmission may be started or stopped in time domain, channel estimation is performed on an interference signal in a time period when the backscatter transmission stops, and interference elimination is performed in a next backscatter transmission period by using a channel estimation result, to obtain channel state information of the interference signal. Elimination of the interference signal during the backscatter transmission may improve reliability of transmission, thus improve transmission throughput, and significantly improve communication quality.

In some implementations, a smart device may stop reflecting a second signal by disabling an RF reflection circuit arranged by the smart device.

The signal transmission apparatus in the embodiments of this application may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a personal computer, a television, an automated teller machine, or a self-service machine. This is not specifically limited in the embodiments of this application.

The signal transmission apparatus in the embodiments of this application may be an apparatus with an operating system. The operating system may be an Android operating system, or may be an iOS operating system or other possible operating systems, which is not specifically limited in the embodiments of this application.

The signal transmission apparatus provided in the embodiments of this application can implement processes implemented by the signal transmission apparatus in the method embodiments of FIG. 2 to FIG. 7. To avoid repetition, details are not described herein again.

Figure 10:
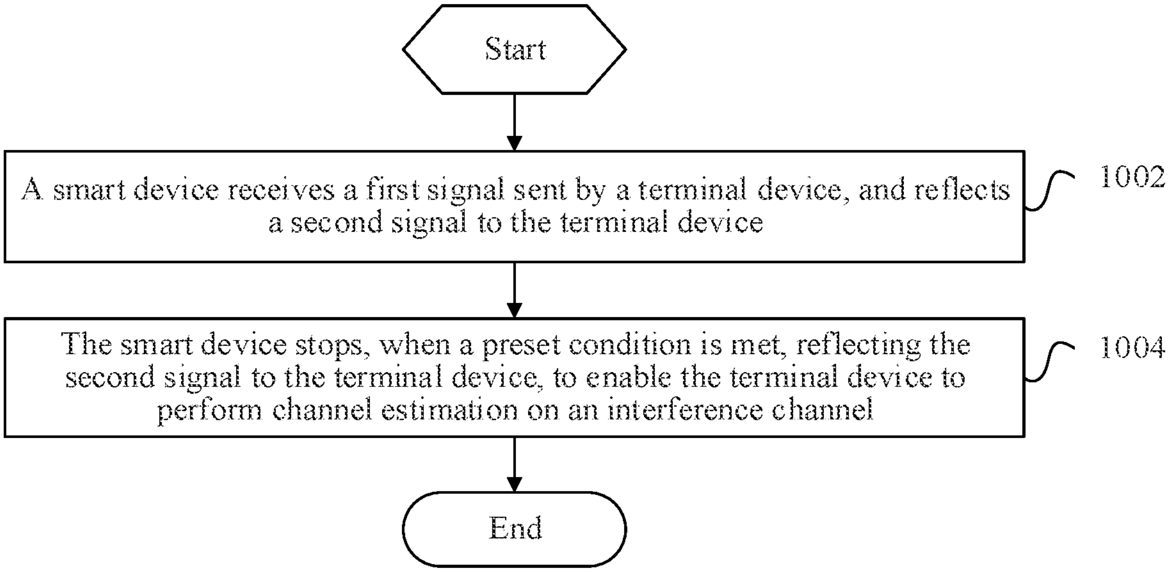
FIG. 10 is a sixth flowchart of a signal transmission method according to an embodiment of this application.

In some embodiments of this application, FIG. 10 is a sixth flowchart of a signal transmission method according to an embodiment of this application. Specifically, the signal transmission method may include the following steps.

Step 1002: A smart device receives a first signal sent by a terminal device, and reflects a second signal to the terminal device.

Step 1004: The smart device stops, when a preset condition is met, reflecting the second signal to the terminal device, to enable the terminal device to perform channel estimation on an interference channel.

In the embodiments of this application, for example, the smart device continuously receives the first signal sent by the terminal device, charges its own circuit through energy carried by the first signal, and accumulates energy. In addition, the smart device reflects, based on a self-defined reflection rule, the second signal to the terminal device.

The smart device stops, when the preset condition is met, reflecting the second signal to the terminal device, to enable the terminal device to perform channel estimation on the interference channel. In some implementations, when the smart device stops reflecting the second signal, a corresponding terminal device no longer receives the second signal, to form a "signal interruption period" for the terminal device. Therefore, the terminal device can use this "signal interruption period" to perform channel estimation on the interference channel in the backscatter communication, and then eliminate an interference signal in a subsequent received reflected signal. Therefore, interference is effectively removed, a problem of signal interference can be solved, and communication quality of a passive or low-power device in backscatter communication can be improved.

In the embodiments of this application, backscatter transmission may be started or stopped in time domain, channel estimation is performed on an interference signal in a time period when the backscatter transmission stops, and interference elimination is performed in a next backscatter transmission period by using a channel estimation result, to obtain channel state information of the interference signal. Elimination of the interference signal during the backscatter transmission may improve reliability of transmission, thus improve transmission throughput, and significantly improve communication quality.

An RF reflection circuit is arranged in the smart device. When the RF reflection circuit is enabled, the smart device can reflect the second signal to the terminal device. After the smart device disables the RF reflection circuit, the smart device stops reflecting the second signal to the terminal device.

In some embodiments of this application, the preset condition includes that the smart device receives interruption signaling sent by the terminal device; and the smart device stops, within first interruption duration corresponding to the interruption signaling, reflecting the second signal to the terminal device.

In the embodiments of this application, the smart device is paired with the terminal device to establish a communication channel. The smart device receives the first signal through the communication channel, and reflects the second signal to the terminal device through the communication channel. Time domain division is performed, in a time division transmission manner, on the communication channel.

When the interruption signaling sent by the terminal device is received, it is determined that the preset condition is met, and in this case, the smart device stops reflecting the second signal.

FIG. 5 is a schematic diagram of first interruption duration in time division transmission. As shown in FIG. 5, a smart device continuously reflects a second signal in a time domain T. After the smart device receives interruption signaling, the smart device stops reflecting the second signal within set first interruption duration T3, to form a "signal interruption period" within the interruption duration. Therefore, the terminal device can use the interruption duration, that is, the "signal interruption period", to perform channel estimation on the interference channel in the backscatter communication, and then eliminate an interference signal in a subsequent received reflected signal. Therefore, interference is effectively removed, a problem of signal interference can be solved, and communication quality of a passive or low-power device in backscatter communication can be improved.

In some embodiments of this application, the preset condition includes: a current moment is within second interruption duration, where the second interruption duration is predefined by a protocol; or the second interruption duration is determined based on a channel transmission speed of a communication channel between the terminal device and the smart device.

In the embodiments of this application, the preset condition further includes that a current moment is within the second interruption duration, where the second interruption duration may be predefined through a communication protocol; or the second interruption duration is determined based on a channel transmission speed of a communication channel between the terminal device and the smart device.

In the embodiments of this application, if it is currently in the second interruption duration, it is determined that the preset condition is met, and in this case, the smart device stops reflecting the second signal.

In some implementations, a time domain resource of the communication channel is divided based on a time division method. FIG. 6 is a schematic diagram of time domain division of time division transmission. T2 is the foregoing second interruption duration. In T1, a smart device normally reflects a second signal. In T2, the smart device stops reflecting the second signal.

In some implementations, a specific length of second interruption duration may be predefined through a communication protocol between a terminal device and the smart device.

In some implementations, the second interruption duration may further be determined based on a channel transmission speed between the terminal device and the smart device. If the channel transmission speed is higher, signal quality is required to be higher. In this case, a frequency and duration of the second interruption duration may be increased to ensure the signal quality.

In some embodiments of this application, it should be noted that, the signal transmission method provided in the embodiments of this application may be performed by a signal transmission apparatus or a control module included in the signal transmission apparatus and configured to perform and load the signal transmission method. In the embodiments of this application, the signal transmission method provided in the embodiments of this application is described by using an example in which the signal transmission method is performed and loaded by the signal transmission apparatus.

Figure 11:
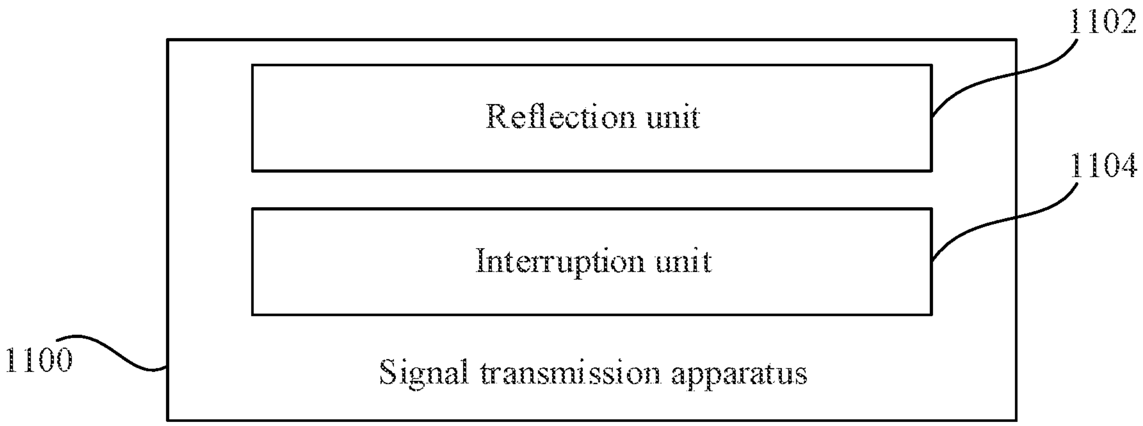
FIG. 11 is a second structural block diagram of a signal transmission apparatus according to an embodiment of this application.

FIG. 11 is a second structural block diagram of a signal transmission apparatus according to an embodiment of this application. In some implementations, a signal transmission apparatus 1100 includes:

a reflection unit 1102, through which a smart device receives a first signal sent by a terminal device, and reflects a second signal to the terminal device; and an interruption unit 1104, through which the smart device stops, when a preset condition is met, reflecting the second signal to the terminal device, to enable the terminal device to perform channel estimation on an interference channel.

In the embodiments of this application, for example, the smart device continuously receives the first signal sent by the terminal device, charges its own circuit through energy carried by the first signal, and accumulates energy. In addition, the smart device reflects, based on a self-defined reflection rule, the second signal to the terminal device.

The smart device stops, when the preset condition is met, reflecting the second signal to the terminal device, to enable the terminal device to perform channel estimation on the interference channel. In some implementations, when the smart device stops reflecting the second signal, a corresponding terminal device no longer receives the second signal, to form a "signal interruption period" for the terminal device. Therefore, the terminal device can use this "signal interruption period" to perform channel estimation on the interference channel in the backscatter communication, and then eliminate an interference signal in a subsequent received reflected signal. Therefore, interference is effectively removed, a problem of signal interference can be solved, and communication quality of a passive or low-power device in backscatter communication can be improved.

In the embodiments of this application, backscatter transmission may be started or stopped in time domain, channel estimation is performed on an interference signal in a time period when the backscatter transmission stops, and interference elimination is performed in a next backscatter transmission period by using a channel estimation result, to obtain channel state information of the interference signal. Elimination of the interference signal during the backscatter transmission may improve reliability of transmission, thus improve transmission throughput, and significantly improve communication quality.

An RF reflection circuit is arranged in the smart device. When the RF reflection circuit is enabled, the smart device can reflect the second signal to the terminal device. After the smart device disables the RF reflection circuit, the smart device stops reflecting the second signal to the terminal device.

The signal transmission apparatus in the embodiments of this application may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, a UMPC, a netbook, or a PDA. The non-mobile electronic device may be a server, an NAS, a personal computer, a television, an automated teller machine, or a self-service machine. This is not specifically limited in the embodiments of this application.

The signal transmission apparatus in the embodiments of this application may be an apparatus with an operating system. The operating system may be an Android operating system, or may be an iOS operating system or other possible operating systems, which is not specifically limited in the embodiments of this application.

The signal transmission apparatus provided in the embodiments of this application can implement processes implemented by the signal transmission apparatus in the method embodiments of FIG. 10. To avoid repetition, details are not described herein again.

Figure 12:
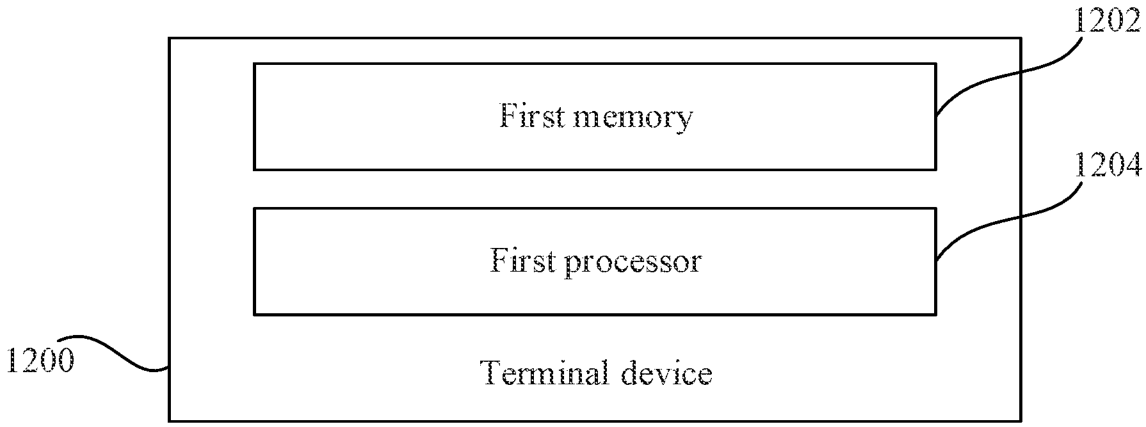
FIG. 12 is a structural block diagram of a terminal device according to an embodiment of this application.

In some embodiments of this application, a terminal device is provided. FIG. 12 is a structural block diagram of a terminal device according to an embodiment of this application. Specifically, a terminal device 1200 includes:

a first memory 1202, storing a program or an instruction; and a first processor 1204, configured to implement, when executing the program or instruction, steps of the signal transmission method according to any one of the foregoing embodiments.

Therefore, the terminal device is configured to implement, when executing a program or an instruction, each process of the foregoing embodiments of the signal transmission method, and the same technical effect can be achieved. To avoid repetition, details are not described herein again.

Figure 13:
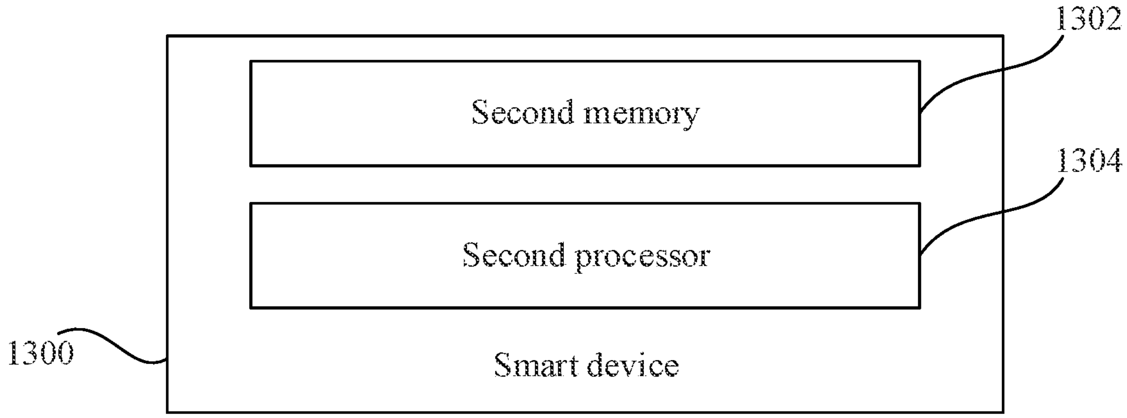
FIG. 13 is a structural block diagram of a smart device according to an embodiment of this application.

In some embodiments of this application, a smart device is provided. FIG. 13 is a structural block diagram of a smart device according to an embodiment of this application. Specifically, a smart device 1300 includes:

a second memory 1302, storing a program or an instruction; and a second processor 1304, configured to implement, when executing the program or instruction, steps of the signal transmission method according to any one of the foregoing embodiments.

Therefore, the smart device is configured to implement, when executing a program or an instruction, each process of the foregoing embodiments of the signal transmission method, and the same technical effect can be achieved. To avoid repetition, details are not described herein again.

In some implementations, the embodiments of this application further provide an electronic device 1900. The electronic device 1900 includes a processor 1910, a memory 1909, and a program or an instruction stored in the memory 1909 and executable on the processor 1910. When the program or instruction is executed by the processor 1910, processes of the foregoing embodiments of the signal transmission method are implemented, and the same technical effect can be achieved. To avoid repetition, details are not described herein again.

It should be noted that the electronic device in the embodiments of this application includes the foregoing mobile electronic device and non-mobile electronic device.

Figure 14:
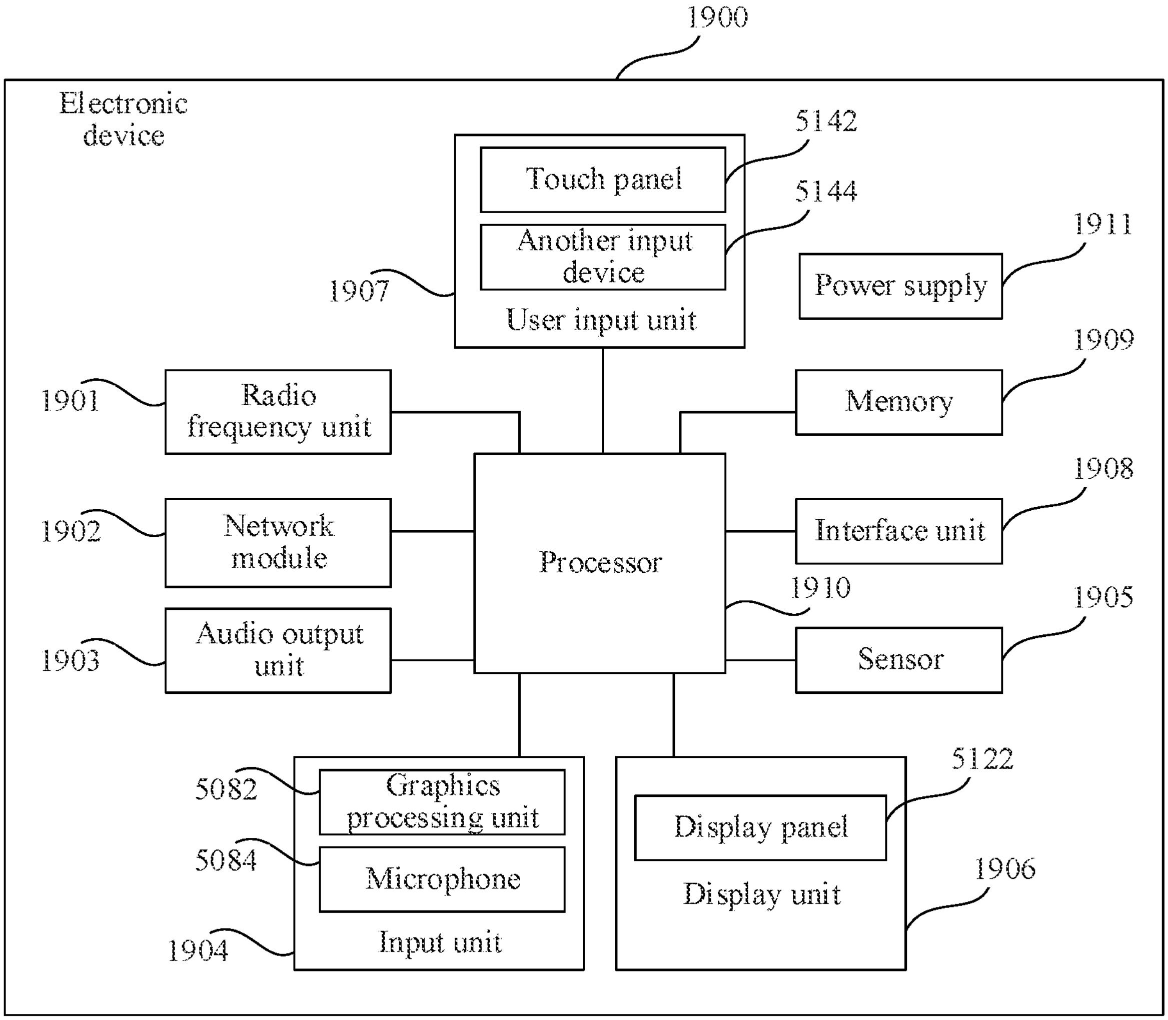
FIG. 14 is a schematic diagram of a hardware structure of an electronic device according to an embodiment of this application.

FIG. 14 is a schematic diagram of a hardware structure of an electronic device according to an embodiment of this application.

The electronic device 1900 includes, but is not limited to: components such as a radio frequency unit 1901, a network module 1902, an audio output unit 1903, an input unit 1904, a sensor 1905, a display unit 1906, a user input unit 1907, an interface unit 1908, a memory 1909, and a processor 1910.

A person skilled in the art may understand that the electronic device 1900 may further include a power supply (such as a battery) for supplying power to the components. The power supply may be logically connected to the processor 1910 through a power management system, to implement functions such as charging, discharging, and power consumption management through the power management system. The structure of the electronic device shown in FIG. 14 constitutes no limitation on the electronic device, and the electronic device may include more or fewer components than those shown in the figure, or some components may be combined, or a different component deployment may be used. Details are not repeated herein again.

The radio frequency unit 1901 is configured to transmit a first signal and interruption signaling, and is configured to receive a second signal.

The processor 1910 is configured to perform channel estimation on an interference channel, to eliminate an interference signal in a received backscatter signal and improve communication quality.

The processor 1910 is further configured to perform signal quality rating on the received second signal. If the rating is lower than a quality level threshold, a piece of interruption signaling is transmitted through the radio frequency unit 1901, to trigger a case that a corresponding smart device stops reflecting the second signal within first interruption duration. During the interruption duration, the processor 1910 performs channel estimation on the interference channel, to eliminate the interference signal in the received backscatter signal and improve communication quality.

It should be understood that, in the embodiments of this application, the radio frequency unit 1901 may be configured to receive and transmit information or receive and transmit a signal during a call. Specifically, downlink data of a base station is received or uplink data is sent to a base station. The radio frequency unit 1901 includes, but is not limited to, an antenna, at least one amplifier, a transceiver, a coupler, a low noise amplifier, a duplexer, and the like.

The network module 1902 provides wireless broadband Internet access for a user, for example, helps the user to receive or send an email, browse a webpage, and access stream media.

The audio output unit 1903 may convert audio data received by the radio frequency unit 1901 or the network module 1902 or stored on the memory 1909 into audio signals and output the audio signals as sounds. In addition, the audio output unit 1903 may further provide an audio output (for example, a call signal reception sound or a message reception sound) related to a specific function performed by the electronic device 1900. The audio output unit 1903 includes a speaker, a buzzer, a receiver, and the like The input unit 1904 is configured to receive an audio or video signal. The input unit 1904 may include a Graphics Processing Unit (GPU) 5082 and a microphone 5084. The graphics processing unit 5082 performs processing on image data of a static picture or a video acquired by an image acquisition apparatus (for example, a camera) in a video acquisition mode or an image acquisition mode. A processed image frame may be displayed on the display unit 1906 or stored in the memory 1909 (or another storage medium) or sent through the radio frequency unit 1901 or the network module 1902. The microphone 5084 may receive a sound and can process the sound into audio data. The processed audio data may be converted, in a phone call mode, into a format that may be sent by the radio frequency unit 1901 to a mobile communication base station, and outputted.

The electronic device 1900 further includes at least one sensor 1905, such as a fingerprint sensor, a pressure sensor, an iris sensor, a molecular sensor, a gyroscope, a barometer, a hygrometer, a thermometer, an infrared sensor, a light sensor, a motion sensor, and another sensor.

The display unit 1906 is configured to display information inputted by the user or information provided for the user. The display unit 1906 may include a display panel 5122. The display panel 5122 may be configured by using a liquid crystal display, an organic light-emitting diode, or the like.

The user input unit 1907 may be configured to receive input digit or character information, and generate a keyboard signal input related to the user setting and function control of the electronic device. In some implementations, the user input unit 1907 includes a touch panel 5142 and another input device 5144. The touch panel 5142 is also referred to as a touch screen and may collect a touch operation performed by a user on or near the touch panel. The touch panel 5142 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and transmits the touch point coordinates to the processor 1910. In addition, the touch controller receives a command transmitted by the processor 1910 and executes the command. The another input device 5144 may include, but is not limited to, a physical keyboard, a functional key (for example, a volume control key or a switch key), a track ball, a mouse, and a joystick, and the details will not be described herein again.

Further, the touch panel 5142 may cover the display panel 5122. After detecting a touch operation on or near the touch panel, the touch panel 5142 transfers the touch operation to the processor 1910, to determine a type of a touch event. Then, the processor 1910 provides a corresponding visual output on the display panel 5122 according to the type of the touch event. The touch panel 5142 and the display panel 5122 may be two independent components or may be integrated into one component.

The interface unit 1908 is an interface for connecting an external apparatus and the electronic device 1900. For example, the external apparatus may include a wired or wireless headset port, an external power supply (or a battery charger) port, a wired or wireless data port, a storage card port, a port used to connect an apparatus having an identification module, an audio Input/Output (I/O) port, a video I/O port, an earphone port, and the like. The interface unit 1908 may be configured to receive an input (for example, data information or electricity) from an external apparatus and transmit the received input to one or more elements in the electronic device 1900, or may be configured to transmit data between the electronic device 1900 and the external apparatus.

The memory 1909 may be configured to store a software program and various data. The memory 1909 may mainly include a program storage area and a data storage area. The program storage area may store an operating system, an application program required by at least one function (for example, a sound playback function and an image display function), and the like. The data storage area may store data (for example, audio data and a phone book) created based on use of a mobile terminal. In addition, the memory 1909 may include a high speed random access memory, and may further include a non-volatile memory, such as at least one magnetic disk storage device, a flash memory, or another non-volatile solid state storage device.

By running or executing a software program and/or a module stored in the memory 1909, and invoking data stored in the memory 1909, the processor 1910 performs various functions of the electronic device 1900 and processes data, to perform overall monitoring on the electronic device 1900. The processor 1910 may include one or more processing units. Preferably, the processor 1910 may integrate an application processor and a modem processor. The application processor mainly processes an operating system, a user interface, an application program, and the like. The modem processor mainly processes wireless communication.

The electronic device 1900 may further include a power supply 1911 for supplying power to each component. In some implementations, the power supply 1911 may be logically connected to the processor 1910 through a power management system, to implement functions such as charging, discharging, and power consumption management through the power management system.

In the embodiments of this application, backscatter transmission may be started or stopped in time domain, channel estimation is performed on an interference signal in a time period when the backscatter transmission stops, and interference elimination is performed in a next backscatter transmission period by using a channel estimation result, to obtain channel state information of the interference signal. Elimination of the interference signal during the backscatter transmission may improve reliability of transmission, thus improve transmission throughput, and significantly improve communication quality.

The embodiments of this application further provide a readable storage medium. The readable storage medium stores a program or an instruction. The program or instruction, when executed by a processor, implements processes of the embodiments of the signal transmission method, and the same technical effects can be achieved. To avoid repetition, details are not described herein again.

The processor is a processor in the electronic device in the foregoing embodiments. The readable storage medium includes a computer-readable storage medium, for example, a computer Read-Only Memory (ROM), a Random Access Memory (RAM), a magnetic disk, or an optical disc.

The embodiments of this application further provide a chip. The chip includes a processor and a communication interface. The communication interface is coupled to the processor, and the processor is configured to run a program or an instruction to implement processes of the embodiments of the signal transmission method, and the same technical effect can be achieved. To avoid repetition, details are not described herein again.

It should be noted that, the chip mentioned in the embodiments of this application may also be referred to as a system-level chip, a system chip, a chip system, a system on chip, or the like.

It needs to be noted that, terms “include,” “comprise,” and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence “including one” does not exclude that there are still other same elements in the process, method, object, or apparatus. Furthermore, it should be noted that a scope of the methods and apparatus in the implementations of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and may also be implemented by hardware. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A signal transmission method, comprising:

sending, by a terminal device, a first signal to a smart device having a backscatter function, and receiving a second signal reflected by the smart device;

performing, by the terminal device, when the smart device stops reflecting the second signal within second interruption duration, channel estimation on an interference channel, and adjusting, by the terminal device, based on a result of the channel estimation, the second interruption duration.

2. The signal transmission method according to claim 1, further comprising:

rating, by the terminal device, signal quality of the second signal, and performing, based on a rating of the signal quality of the second signal, the channel estimation.

3. The signal transmission method according to claim 2, wherein the performing, based on a rating of the signal quality of the second signal, the channel estimation comprises:

sending, by the terminal device, in a case that the rating is lower than a preset quality level threshold, interruption signaling to the smart device, to enable the smart device to stop reflecting the second signal within first interruption duration corresponding to the interruption signaling.

4. The signal transmission method according to claim 1, wherein prior to being adjusted, the second interruption duration is predefined by a protocol, or the second interruption duration is determined based on a channel transmission speed of a communication channel between the terminal device and the smart device.

5. The signal transmission method according to claim 1, wherein, after the performing, by the terminal device, channel estimation on an interference channel, the signal transmission method further comprises:

determining, by the terminal device, through the channel estimation, channel state information of the interference channel, and eliminating, through the channel state information, an interference signal.

6. The signal transmission method according to claim 5, wherein the performing, by the terminal device, channel estimation on an interference channel comprises:

sending, by the terminal device, when the smart device stops reflecting the second signal, a third signal continuously, and receiving the interference signal reflected by an environment; and determining the interference channel corresponding to the interference signal, and performing the channel estimation on the interference channel, wherein the third signal is a preset signal, or the third signal is the first signal.

7. A signal transmission method, comprising:

receiving, by a smart device, a first signal sent by a terminal device, and reflecting a second signal to the terminal device; and stopping, by the smart device when a preset condition is met, reflecting the second signal to the terminal device, to enable the terminal device to perform a channel estimation on an interference channel, wherein the preset condition comprises:

a current moment is within second interruption duration, wherein the second interruption duration is adjusted based on a result of the channel estimation.

8. The signal transmission method according to claim 7, wherein the preset condition comprises:

the smart device receives interruption signaling sent by the terminal device, and wherein the stopping, by the smart device, reflecting the second signal to the terminal device comprises:

stopping, by the smart device within first interruption duration corresponding to the interruption signaling, reflecting the second signal to the terminal device.

9. The signal transmission method according to claim 8, wherein prior to being adjusted, the second interruption duration is predefined by a protocol, or the second interruption duration is determined based on a channel transmission speed of a communication channel between the terminal device and the smart device.

10. A smart device, comprising:

a second memory, storing a program or an instruction; and a second processor, configured to implement, when executing the program or instruction, steps of the signal transmission method according to claim 7.

11. A terminal device, comprising:

a memory storing computer-readable instructions; and a processor coupled to the memory and configured to perform operations comprising:

sending, by the terminal device, a first signal to a smart device having a backscatter function, and receiving a second signal reflected by the smart device;

performing, by the terminal device within second interruption duration, when the smart device stops reflecting the second signal, channel estimation on an interference channel, and adjusting, by the terminal device, based on a result of the channel estimation, the second interruption duration.

12. The terminal device according to claim 11, wherein the operations further comprise:

rating, by the terminal device, signal quality of the second signal, and performing, based on a rating of the signal quality of the second signal, the channel estimation.

13. The terminal device according to claim 12, wherein the performing, based on the rating of the signal quality of the second signal, the channel estimation comprises:

sending, by the terminal device, in a case that the rating is lower than a preset quality level threshold, interruption signaling to the smart device, to enable the smart device to stop reflecting the second signal within first interruption duration corresponding to the interruption signaling.

14. The terminal device according to claim 11, wherein the second interruption duration is predefined by a protocol, or the second interruption duration is determined based on a channel transmission speed of a communication channel between the terminal device and the smart device.

15. The terminal device according to claim 11, wherein, after the performing, by the terminal device, channel estimation on an interference channel, the operations further comprise:

determining, by the terminal device, through the channel estimation, channel state information of the interference channel, and eliminating, through the channel state information, an interference signal.

16. The terminal device according to claim 15, wherein the performing, by the terminal device, channel estimation on an interference channel comprises:

sending, by the terminal device, when the smart device stops reflecting the second signal, a third signal continuously, and receiving the interference signal reflected by an environment; and determining the interference channel corresponding to the interference signal, and performing the channel estimation on the interference channel, wherein the third signal is a preset signal, or the third signal is the first signal.

* * * * *